US006761862B1

(12) United States Patent
Brusie

(10) Patent No.: US 6,761,862 B1
(45) Date of Patent: Jul. 13, 2004

(54) METHOD OF DETERMINING THE EXTENT TO WHICH A NICKEL STRUCTURE HAS BEEN ATTACHED BY A FLUORINE-CONTAINING GAS

(75) Inventor: James P. Brusie, Oak Ridge, TN (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 02/618,355

(22) Filed: Sep. 24, 1945

(51) Int. Cl.[7] .............................................. C01G 53/00
(52) U.S. Cl. ...................... 423/149; 423/258; 376/409
(58) Field of Search ........................... 23/267; 423/149, 423/258; 376/409

(56) References Cited

U.S. PATENT DOCUMENTS 2,043,103 A    6/1936  Kester ......................... 23/267

OTHER PUBLICATIONS

Mellor, "Inorganic and Theoretical Chemistry", vol. 15, p. 406, Published by Longmans, Green, and Co.,London, (1936) Copy in Division 59.

Primary Examiner—Jack Keith
(74) Attorney, Agent, or Firm—Emily G. Schneider; Paul A. Gottlieb

(57) ABSTRACT

The method of determining the extent to which a nickel structure has been attacked by a halogen containing gas to which it has been exposed which comprises preparing a quantity of water substantially free from dissolved oxygen, passing ammonia gas through a cuprammonium solution to produce ammonia substantially free from oxygen, dissolving said oxygen-free ammonia in said water to produce a saturated aqueous ammonia solution free from uncombined oxygen, treating at least a portion of said nickel structure of predetermined weight with said solution to dissolve nickel compounds from the surface of said structure without dissolving an appreciable amount of said nickel and analyzing the resulting solution to determine the quantity of said nickel compounds that was associated with said said portion of said structure to determine the proportion of combined nickel in said nickel structure.

2 Claims, 1 Drawing Sheet

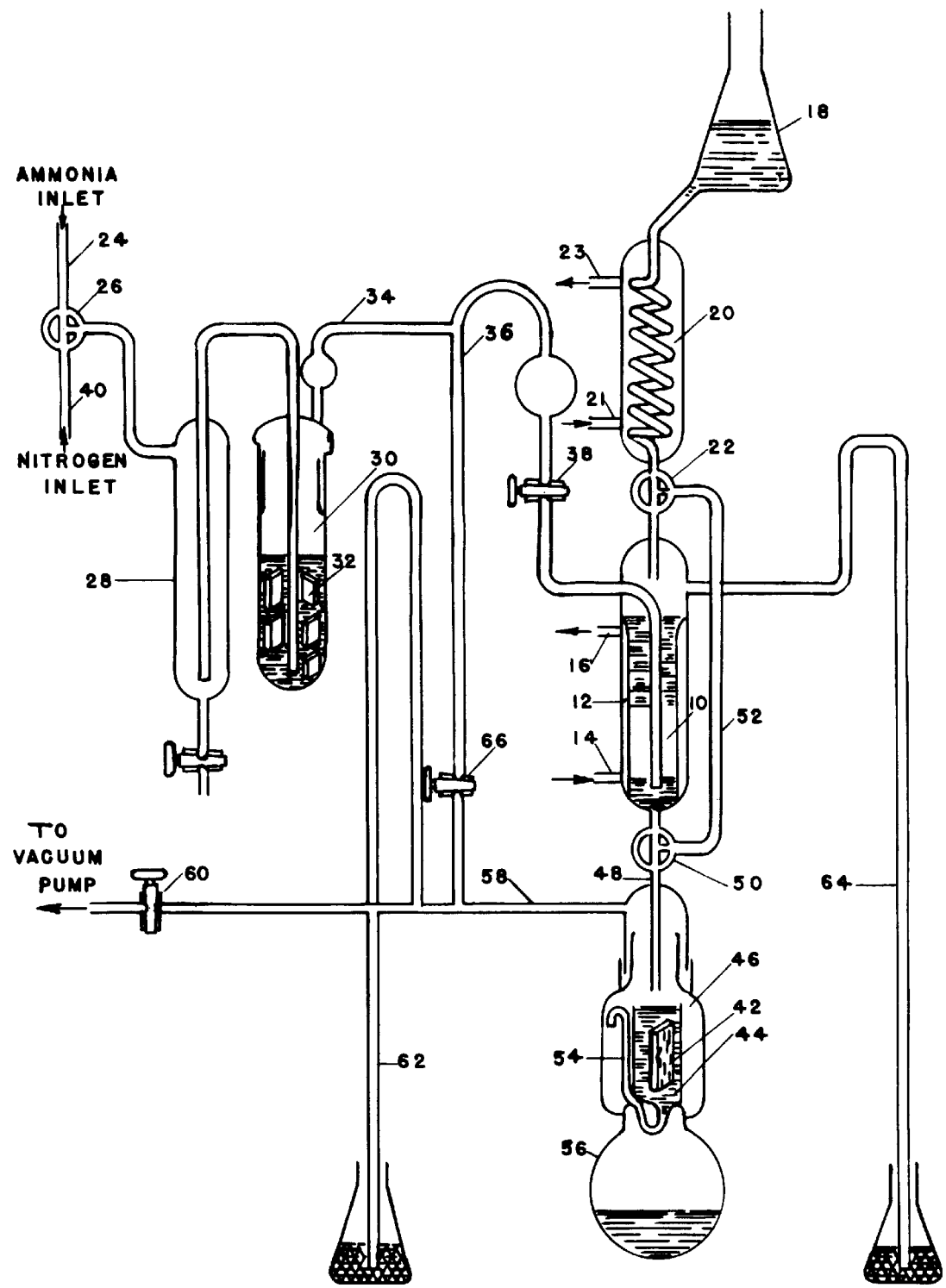

METHOD OF DETERMINING THE EXTENT TO WHICH A NICKEL STRUCTURE HAS BEEN ATTACHED BY A FLUORINE-CONTAINING GAS

This invention relates to the selective dissolution of metal compounds from metal surfaces and more particularly to a method of determining the proportion of chemically combined nickel in a finely porous, permeable, metal membrane.

In recent years there has been considerable interest in the use of diffusional separation processes for the separation of the components of difficultly separable gaseous mixtures and in the development of suitable finely porous permeable metal membranes for use in such processes. In order to operate satisfactorily as a diffuser-separator such membranes must have a multitude of exceedingly fine pores i.e. pores so small as to be beyond the resolving power of the light microscope. Membranes of this character may be used with advantage to separate the components of gaseous mixtures that comprise or consist of the isotopes of an element; for example, they may be used to separate the isotopic species of uranium hexafluoride $U^{235}F_6$ and $U^{238}F_6$ or the isotopes of chlorine $Cl_2^{35}$ and $Cl_2^{37}$.

Then finely porous metal diffuser membranes are used in separating gaseous mixtures containing or consisting of highly corrosive gases such as uranium hexafluoride a number of problems arise due to the tendency of the corrosive gas to attack the constituent metal of the membrane. Because of its finely porous character the membrane has a very large total surface area exposed to the gas being separated and thus it is easily possible for chemical attack to proceed to the point where the fine pores are substantially completely plugged with corrosion products and the membrane rendered useless for its intended purpose.

In the case of uranium hexafluoride the chemical attack of the gas on the membrane may be reduced by forming the membrane of a relatively resistant metal such as nickel or copper and may be retarded by protecting the membrane with, for example, elemental fluorine to form a protective coating of nickel fluoride on the membrane surfaces under controlled conditions. However, even under optimum conditions the hexafluoride gas continues to attack the membrane and eventually the pores of the membrane become plugged. It is thus desirable in connection with such diffusion processes to have a method of determining the extent to which the membrane has been attacked at any given time and the present invention provides a method whereby the metal compounds formed by the action of the hexafluoride gas on the constituent metal of the membrane may be removed from the membrane and analyzed to determine the proportion of combined metal present in the membrane.

It is accordingly an object of the present invention to provide a method for determining the extent to which a finely porous metal membrane has been attacked by a corrosive gas to which it has been exposed.

It is a further object of the invention to provide an improved method for selectively removing nickel compounds from nickel surfaces without dissolving appreciable amounts of metallic nickel.

It is still another object of the invention to provide an improved method of dissolving nickel compounds from the pores of a finely porous nickel membrane so that the proportion of combined nickel in the membrane can be determined.

Other objects of the invention will be in part obvious and in part pointed out hereinafter.

As conducive to a clearer understanding of the present invention it may be pointed out that when a finely porous, permeable nickel membrane is used in the diffusion separation of the isotopic species of uranium hexafluoride, the hexafluoride tends to react with the constituent metal of the membrane to form nickel fluoride and the hexafluoride is reduced to the tetrafluoride. The extent to which this reaction has proceeded may be determined by removing the nickel fluoride from a given portion of the membrane and determining by standard methods of chemical an analysis the quantity of combined nickel that was associated with the given portion of membrane. However, the problem of removing nickel fluoride quantitatively from such a nickel membrane in order to make an accurate analysis is a difficult one, particularly in view of the finely porous character of the structure. Nickel fluoride is somewhat soluble in water but if an attempt is made to leach out the nickel fluoride with water two difficulties are encountered. On the one hand the finely porous character of the membrane makes it difficult for the water to reach the nickel fluoride and this fact coupled with the fact that the solubility of nickel fluoride in water is relatively low, results in a rate of dissolution that is impractically slow where quantitative removal is important. On the other hand the nickel fluoride tends to hydrolyze in water to form hydrofluoric acid which in turn reacts with the nickel of the membrane to form more nickel fluoride. To the extent that such additional nickel fluoride is formed the analysis will be in error.

I have discovered that the foregoing difficulties may be avoided and quantitative and highly selective removal of nickel fluoride and other nickel compounds from a nickel membrane may be achieved by using as a dissolving agent an aqueous solution of ammonium hydroxide that is substantially free from uncombined oxygen. Such a solution rapidly dissolves nickel fluoride from the fine pores of the membrane, the rate of solution being presumably accelerated by the formation of nickel-ammonium ions. It has been further found that if the ammonia solution is carefully purified to remove free oxygen the tendency of the solution to attack the metal of the membrane is negligible and the removal of nickel fluoride is quantitative. The nickel content of the resulting solution may be determined by the usual gravimetric method or by other known standard methods of analysis.

Apparatus comprising an extraction system capable of carrying out the method of the invention is diagrammatically illustrated in the accompanying drawing. Referring to the drawing the numeral 10 designates a chamber which is adapted to contain a supply of oxygen-free ammonia and which is provided with a passage 12 through which a coolant such as water may flow to cool the ammonia solution in the chamber 10. Water may be admitted to the chamber 12 through an inlet 14 and leaves through an outlet 16.

The chamber 10 is supplied with water that has been boiled to remove dissolved oxygen. Oxygen-free water is stored in a flask 18 and may flow to the chamber 10 through a cooler 20, a three-way cock 22 being provided between the cooler and chamber to control the flow of water. The cooler 20 is provided with the cooling water connections 21 and 23 for admission and withdrawal of cooling water respectively. The ammoniacal solution in chamber 10 is prepared by passing substantially oxygen-free ammonia through the oxygen-free water supplied from the flask 18. Ammonia from a suitable source enters the system through a conduit 24 containing the three-way cock 26 and flows through a trap 28 to the deoxygenator 30 that contains cuprammonium solution in which the pieces of metallic copper 32 are placed. In the deoxygenator 30 the ammonia is bubbled through the cuprammonium solution and any oxygen present in the ammonia is removed. From the deoxygenator 30 the ammonia flows through the conduits 34 and 36 and stopcock 38 to the chamber 10. The pipe 36 desirably extends substantially to the bottom of chamber 10 so that the ammonia may be effectively bubbled into the water or solution in the chamber. At the point where the ammonia enters the system and connected to the stopcock 26 there is a conduit 40 which is connected to a suitable source of nitrogen for use in purging the system in a manner described hereafter.

The sample to be extracted 42 is located in a sample holder 44 contained in an air-tight extraction chamber 46. Solution is fed to the holder 44 from chamber 10 through a conduit 48 containing a three-way cock 50. A by-pass 52 is provided around the chamber 10 to permit oxygen-free water to be supplied to the holder. Solution flows from the bottom of sample holder 44 through an overflow conduit 54 and then down into a receiving flask 56 where it is collected for purposes of analysis. The conduit 54 operates to maintain a constant liquid level in the holder 44.

The top of extraction chamber 46 is connected by a conduit 58 containing a stopcock 60 with a vacuum pump (not shown). To guard against the development of excessive pressures in the system conventional mercury seals 62 and 64 are provided which are connected to conduit 58 and the too of chamber 10 respectively. The conduit 36, previously described as extending into the chamber 10, is connected at its other end to the conduit 58 and contains a stopcock 66.

The operation of the apparatus described is as follows: Flask 18 is filled with boiled water and stopcocks 22 and 50 are positioned to cause a flow of water through condenser 20 and chamber 10 to remove any oxygen-containing liquids that may be present. During this flushing operation the lower portion of extraction chamber 46 and receiving flask 56 are removed. When the flushing operation is complete stopcock 22 is positioned to shut off the flow of water from flask 18 and stopcocks 38 and 66 are closed. A sample of porous permeable nickel membrane to be extracted is placed in the holder 44, and the extraction chamber 46 and receiving flask 56 are connected to the system, following which the stopcock 60 is opened to evacuate the system. Stopcock 60 is then closed, stopcocks 38 and 66 opened and stopcock 26 opened to conduit 40 to cause nitrogen to flow into the system. The purpose of the admission of nitrogen is to purge the system of oxygen and the alternate evacuation of the system and admission of nitrogen are desirably repeated five times or more to make sure that oxygen is completely removed from the system. The final step in the purging operation is evacuation.

When the purging operation is completed and the system has been evacuated stopcocks 38, 50, 60 and 66 are closed and stopcock 22 opened to cause water to flow into chamber 10 until the chamber is about half full. Stopcock 22 is then closed and stopcocks 26 and 38 opened to cause ammonia to flow through the deoxygenator 30 and into chamber 10 until a saturated ammonia solution is formed. The vacuum in the lower portion of the system is broken by momentarily opening stopcock 66. Then stopcocks 26, 38, and 66 are closed and stopcock 50 is opened to permit ammonia solution to flow into holder 44 to the level permitted by the overflow conduit 54.

The extraction of nickel fluoride from the sample 42 is indicated by a blue coloration of the solution in the holder 44. When the holder has been initially filled ammonia solution is added either periodically or continuously at a relatively slow rate and solution containing extracted nickel fluoride flows through conduit 54 and down into flask 56. The end point of the extraction process can be determined by observing when the blue coloration of the solution in the holder 44 disappears. At the end of the extraction stopcocks 22 and 50 are positioned to cause oxygen-free water to flow through conduit 52 to wash the sample, the wash water being added to the solution in flask 56.

The solution in the flask is treated with caustic soda solution and heated to drive off the ammonia after which the solution is in condition for analysis by any of the conventional analytical techniques for determining nickel. The quantity of extracted nickel is compared with the predetermined weight of the sample to determine the proportion of combined nickel in the original sample.

From the foregoing description it is apparent that the present invention provides an effective method of selectively and quantitatively removing nickel compounds from a finely porous nickel structure and may also be used to selectively remove nickel compounds from any metallic nickel surface. Since many embodiments might be made of the present invention and since many changes might be made in the embodiment described, it is to be understood that the foregoing description is to be interpreted as illustrative only and not in a limited sense.

I claim:

1. The method of determining the extent to which a nickel structure has been attacked by a halogen containing gas to which it has been exposed which comprises preparing a quantity of water substantially free from dissolved oxygen, passing ammonia gas through a cuprammonium solution to produce ammonia substantially free from oxygen, dissolving said oxygen-free ammonia in said water to produce a saturated aqueous ammonia solution free from uncombined oxygen, treating at least a potion of said nickel structure of predetermined weight with said solution to dissolve nickel compounds from the surface of said structure without dissolving an appreciable amount of said nickel and analyzing the resulting solution to determine the quantity of said nickel compounds that was associated with said said portions of said structures to determine the proportion of combined nickel in said nickel structure.

2. The method of determining the extent to which a finely porous, permeable nickel diffuser-separator membrane has been attacked by halogen-containing gases to which it has been exposed which comprises preparing a quantity of water substantially free from dissolved oxygen, passing ammonia gas through a cuprammonium solution to produce ammonia substantially free from oxygen, dissolving said oxygen-free ammonia in said water to produce a saturated aqueous ammonia solution free from uncombined oxygen, treating a sample of said membrane of predetermined weight with said solution to dissolve nickel compounds from the surface of said sample without dissolving an appreciable amount of said nickel and analyzing the resulting solution to determine the quantity of said nickel compounds that was associated with said sample to determine the proportion of combined nickel in said membrane.

* * * * *